United States Patent

[11] 3,621,871

| [72] | Inventors | Wilbur J. Zimmerle<br>Bellbrook;<br>Lamar L. Kerr, Englewood; Loren R. Gute,<br>Dayton, all of Ohio |
|---|---|---|
| [21] | Appl. No. | 885,060 |
| [22] | Filed | Dec. 15, 1969 |
| [45] | Patented | Nov. 23, 1971 |
| [73] | Assignee | General Motors Corporation<br>Detroit, Mich. |

[54] PRESSURE CONTROL VALVE
4 Claims, 2 Drawing Figs.

[52] U.S. Cl. .................................................. 137/493,
55/310, 55/313, 55/316, 55/385, 55/417
[51] Int. Cl. ............................................. F16k 17/26
[50] Field of Search ............................................
137/479–482, 484.2, 484.4, 484.8, 493, 493.8,
493.9, 544, 484.6; 123/136, 119 B, 198 E; 55/316,
510, 310, 313, 385, 417

[56] References Cited
UNITED STATES PATENTS

| 2,989,073 | 6/1961 | Goodwin ..................... | 137/493.8 |
| 3,145,697 | 8/1964 | Barr et al. ..................... | 123/119 B |
| 3,439,873 | 4/1969 | Relf ............................. | 137/493.9 |
| 3,518,977 | 8/1970 | Smith ........................... | 123/136 |

FOREIGN PATENTS

| 1,205,726 | 8/1959 | France ......................... | 137/493.9 |
| 893,616 | 10/1953 | Germany...................... | 137/493 |

*Primary Examiner*—Frank W. Lutter
*Assistant Examiner*—Bernard Nozick
*Attorneys*—J. L. Carpenter and C. K. Veenstra

ABSTRACT: A valve in an automotive fuel tank vent line has a pair of pressure-responsive members which respectively relieve excess pressure and vacuum in the vent line.

PATENTED NOV 23 1971

3,621,871

INVENTORS.
Loren R. Gute,
Lamar L. Kerr &
BY Wilbur J. Zimmerle

C.K. Veenstra
ATTORNEY

PRESSURE CONTROL VALVE

SUMMARY OF THE INVENTION

This invention provides a valve for controlling a range of pressures in a fluid flow conduit. This valve is particularly advantageous when used to relieve excess pressure and vacuum in an automotive fuel tank vent line.

Various proposals for reducing the loss of fuel vapors from vehicular fuel tanks to the atmosphere have included systems in which the fuel tank vent lines are rerouted to fuel vapor storage devices. To assure efficient operation of some of these systems, it is desirable to control the range of pressures experienced by the fuel tank and the vent lines.

This invention provides a pressured control valve which may be incorporated in a tank vent line. The valve opens to admit air to the vent line, and thus to the fuel tank, if the pressure therein falls below atmospheric pressure by a predetermined amount. The valve also opens to relieve pressure in the vent line, and thus in the fuel tank, if the pressure therein rises above atmospheric pressure by a predetermined amount.

The details as well as other objects and advantages of this invention are set forth in the drawing and in the description of the preferred embodiment.

DESCRIPTION OF A PREFERRED EMBODIMENT

Figure 1:
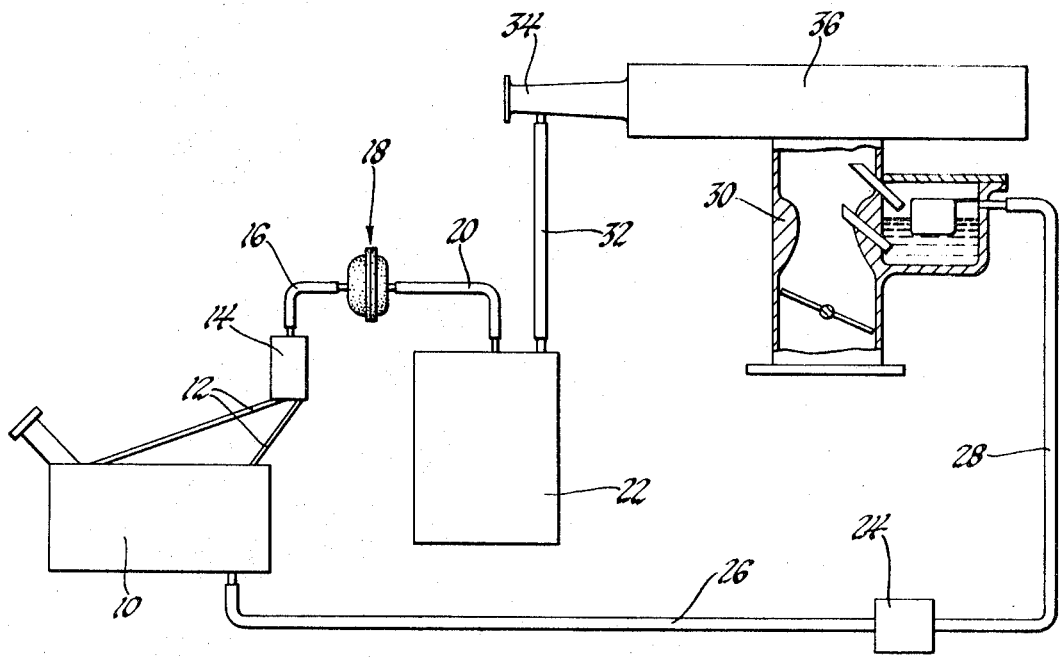
FIG. 1 is a schematic view of an automotive fuel and evaporative control system showing the pressure control valve disposed in the fuel tank vent line.

Referring first to FIG. 1, a fuel tank 10 has a plurality of vent lines 12 which admit air to tank 10 as liquid fuel is withdrawn and which emit fuel vapor formed by evaporation in tank 10. Vent lines 12 extend to a separator 14 which prevents loss of liquid fuel through vent lines 12. A single vent line 16 extends from separator 14 to the pressure control valve 18. A vent line or conduit 20 extends from pressure control valve 18 to a fuel vapor adsorption canister 22. As fuel vapor is formed in fuel tank 10, it passes through vent lines 12, separator 14, vent line 16, pressure control valve 18, and vent line 20 into adsorption canister 22.

A fuel pump 24 draws liquid fuel from tank 10 through a fuel line 26 for delivery through a fuel line 28 to a carburetor 30. As fuel is withdrawn from tank 10, air enters tank 10 through the base of canister 22, vent line 20, pressure control valve 18, vent line 16, separator 14, and vent lines 12.

During engine operation, air is drawn through the base of canister 22 and a purge line 32 into the snorkel 34 of air cleaner 36. This air flow purges fuel vapor from canister 22, and the fuel vapor is delivered through air cleaner 36 and carburetor 30 to the engine.

Figure 2:
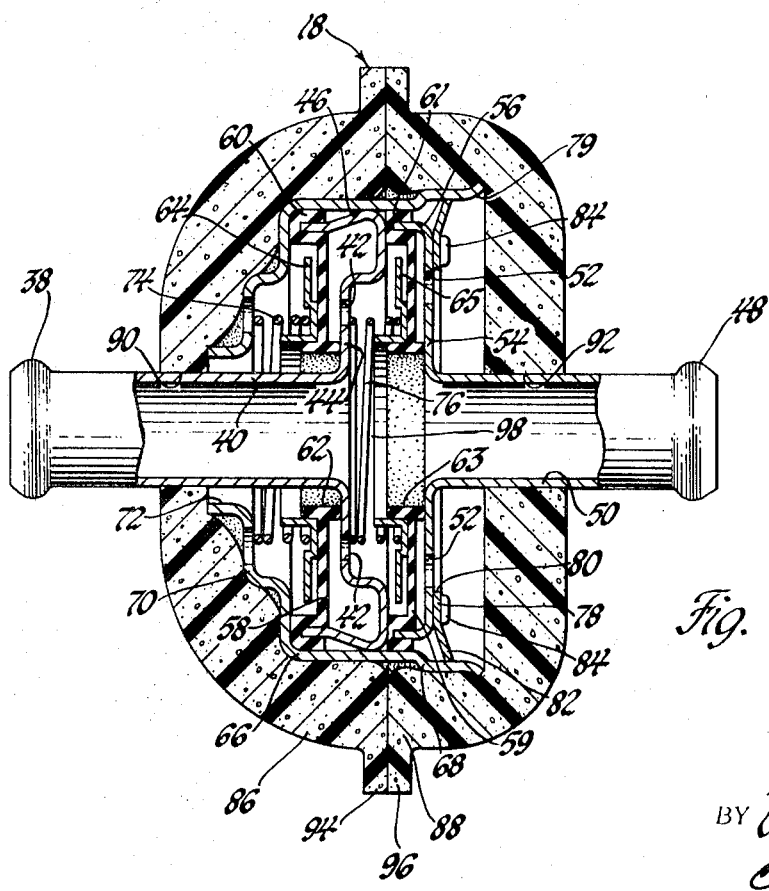
FIG. 2 is an enlarged sectional view of the pressure control valve showing the details of its construction.

Pressure control valve 18 is shown in detail in FIG. 2. It has a tubular fitting 38, adapted for connection to vent line 16, which is formed as a portion of a member 40. Member 40 also has a plurality of apertures 42, spaced around an annular radially extending portion 44, and an axially extending rim 46. A second tubular fitting 48, adapted for connection to vent line 20, is formed as a portion of a member 50 which has a series of apertures 52, spaced about an annular radially extending portion 54, and an axially extending rim 56.

A pair of identical flexible annular diaphragmlike pressure-responsive seals 58, 59 each have a channel 60, 61 formed in the outer perimeter which engage rims 46 and 56 of members 40 and 50 and secure seals 58 and 59 thereto. Each seal 58, 59 is further provided with an enlarged bead 62, 63 around its inner perimeter. Bead 62 engages radial portion 44 of member 40 along a circle intermediate fitting 38 and apertures 42, and bead 63 engages radial portion 54 of member 50 along a circle intermediate fitting 48 and apertures 52. A pair of identical spring seat members 64, 65 back up seals 58 and 59.

A cup-shaped member 66 has an axially extending wall 68 which surrounds both members 40 and 50 and seals 58 and 59 and aligns them on a common axis. Cup-shaped member 66 has a base 70 with a central opening 72 which receives fitting 38. A coil spring 74 is disposed between base 70 of cup-shaped member 66 and spring seat member 64 and biases seal 58 against radial portion 44 of member 40. Similarly, a coil spring 76 is disposed between radial portion 44 of member 40 and spring seat member 65 and biases seal 59 against radial portion 54 of member 50.

A retaining ring 78, located at the open end 79 of cup-shaped member 68, has a central opening 80 which receives fitting 48 and an outer perimeter 82 which engages axial portion 68 of cup-shaped member 66 with an interference fit. Retaining ring 78 thus prevents axial displacement of members 40 and 50 and seals 58 and 59 within cup-shaped member 66. If desired, retaining ring 78 may be assembled to radial portion 54 of member 50 by a plurality of tangs 84 bent outwardly from member 50 over retaining ring 78.

A pair of polyurethane filter elements 86, 88 have central openings 90, 92 respectively which are received over fittings 38 and 48. The outer rims 94, 96 of elements 86 and 88 are secured together to form a housing surrounding cup-shaped member 66 and a filter for air flow through apertures 52.

In operation, the range of pressure in the chamber 98 formed by members 40 and 50 is controlled by movement of seals 58 and 59. If pressure in chamber 98 rises to a predetermined level above atmospheric, 20 inches of water, for example, seal 58 will be moved away from radial portion 44 of member 40, against the bias of spring 74, so that fluid in chamber 98 may be expelled through apertures 42. If pressure in chamber 98 falls to a predetermined level below atmospheric, 6 inches of water, for example, seal 59 will be moved away from radial portion 54 of member 50, against the bias of spring 76, so that air may be admitted to chamber 98 through apertures 52.

It will be appreciated that many changes may be made in the design details of pressure control valve 18 without departing from the basic construction thereof. As but one example, it is noted that seals 58 and 59 could be formed from material of sufficient resilience and elasticity that biasing springs 74 and 76 would be unnecessary. It will also be appreciated that pressure control valve 18, if properly calibrated, could be utilized in other systems and environments.

We claim:

1. A pressure control valve comprising
first and second structural members defining a chamber and each including an annular and radially extending portion and a tubular fitting portion extending axially from said annular portion, said members being disposed about a common axis and oriented whereby said annular portions define opposite ends of said chamber and whereby said tubular fitting portions extend outwardly from said chamber and define conduit means opening into said opposite ends of said chamber, said annular portions each having a plurality of apertures opening axially therethrough and disposed outwardly of a circle having a diameter greater than said tubular fitting portions, said members further including outer peripheral rim portions extending axially from said annular portions and extending away from and in part defines said chamber respectively, a first flexible annular pressure-responsive sealing member disposed adjacent said annular portion of said first structural member on the exterior of said chamber, a second flexible annular pressure-responsive sealing member disposed adjacent said annular portion of said second structural member on the interior of said chamber, said sealing members each having outer perimeters received by and secured to said outer rim portions of said first and second structural members respectively, said sealing members each further having inner perimeters disposed on said circle whereby said first and second sealing members overlie said apertures in said annular portions of said first and second structural members respectively, a generally cup-shaped member having an axially extending portion surrounding said structural and sealing members and preventing radial displacement of said structural members relative to each other and having a base portion adjacent and overlying said first sealing member, said base portion having an opening receiving said tubular fitting portion of said first structural member, first and second annular spring seat members disposed adjacent and overlying said first and second sealing members respectively, a first coil spring extending between said base portion of said cup-shaped member and said first spring seat member and biasing said inner perimeter of said first sealing member against said annular portion of said first structural member whereby said first sealing member permits fluid flow through said apertures in said first structural member only when the pressure on the chamber side of said first sealing member is greater than the pressure on the other side of said first sealing member by a predetermined amount, a second coil spring extending between said annular portion of said first structural member and said second spring seat member and biasing said inner perimeter of said second sealing member against said annular portion of said second structural member whereby said second sealing member permits fluid flow through said apertures in said second structural member only when the pressure on the chamber side of said second sealing member is less than the pressure on the other side of said second sealing member by a predetermined amount, said first sealing member thereby operating to counteract a predetermined increase in pressure in said chamber and conduit means by permitting emission of fluid from said chamber, said second sealing member thereby operating to counteract a predetermined reduction in pressure in said chamber and said conduit means by permitting admission of fluid to said chamber, an annular retaining ring member disposed adjacent and overlying said annular portion of said second structural member on the exterior of said chamber, said ring member having an opening receiving said tubular fitting portion of said second structural member and having an outer peripheral rim portion engaging said axially extending portion of said cup-shaped member and preventing axial displacement of said structural members and said cup-shaped member relative to each other, and a pair of flexible annular polyurethane filter elements having inner rims respectively engaging said tubular fitting portions of said structural members and having outer rims secured together, thereby forming a housing surrounding said cup-shaped member and a filter for fluid passing through said apertures.

2. A pressure control valve comprising first and second members defining a chamber and each including an annular and radially extending portion and a tubular fitting portion extending axially from said annular portion, said members being disposed along a common axis and oriented whereby said annular portions define opposite ends of said chamber and whereby said tubular portions extend outwardly from said chamber and define conduit means opening into said opposite ends of said chamber, said annular portions each having a plurality of apertures opening axially therethrough and disposed outwardly of a selected radial distance from the axis of said members, first and second flexible annular pressure-responsive seals respectively overlying said annular portions of said first and second members, said first seal being disposed without said chamber and having an outer perimeter secured to the outer perimeter of said annular portion of said first member and having an inner perimeter disposed at said selected radial distance from said axis, said inner perimeter of said first seal being biased against said annular portion of said first member to permit passage of fluid from said chamber through said apertures in said first member but to prevent passage of fluid into said chamber through said apertures in said first member, said second seal being disposed within said chamber and having an outer perimeter secured to the outer perimeter of said annular plate portion of said second member and having an inner perimeter disposed at said selected radial distance from said axis, said inner perimeter of said second seal being biased against said annular portion of said second member to permit passage of fluid into said chamber through said apertures in said second member but to prevent passage of fluid from said chamber through said apertures in said second member, whereby said first seal operates to counteract a predetermined increase in pressure in said chamber and said conduit means by permitting emission of fluid from said chamber and said second seal operates to counteract a predetermined reduction in pressure in said chamber and said conduit means by permitting admission of fluid to said chamber, and a generally cup-shaped member having an axially extending portion surrounding said members for preventing radial displacement of said members relative to each other and having a base portion adjacent and overlying said first seal, said base portion having an opening which receives said tubular fitting portion of said first member.

3. The pressure control valve of claim 2 which further comprises a first coil spring extending between said base portion of said cup-shaped member and said first seal and biasing said inner perimeter of said first seal against said annular plate portion of said first member, and a second coil spring extending between the annular portion of said first member and said second seal and biasing said inner perimeter of said second seal against said annular plate portion of said second member.

4. The pressure control valve of claim 2 which further comprises a pair of annular filter elements having inner rims respectively engaging said tubular fitting portions of said members and having outer rims secured together, thereby forming a housing surrounding said annular portions of said members and said seals and a filter for fluid passing through said apertures.

* * * * *